June 10, 1958 J. J. HOEHN ET AL 2,838,305

MAGNETIC RECORDING AND REPRODUCING APPARATUS

Original Filed July 1, 1954 4 Sheets-Sheet 1

INVENTORS
John J. Hoehn &
Fielding B. Hills
BY Morris A. Rabkin
ATTORNEY

MAGNETIC RECORDING AND REPRODUCING APPARATUS

Original Filed July 1, 1954

4 Sheets-Sheet 2

INVENTORS
John J. Hoehn &
Fielding B. Hills
BY Morrish Rabkin
ATTORNEY

MAGNETIC RECORDING AND REPRODUCING APPARATUS

Original Filed July 1, 1954 4 Sheets-Sheet 3

INVENTORS
John J. Hoehn &
Fielding B. Hills
BY Morris L. Rabkin
ATTORNEY

MAGNETIC RECORDING AND REPRODUCING APPARATUS

Original Filed July 1, 1954 4 Sheets-Sheet 4

INVENTORS
John J. Hoehn &
Fielding B. Hills
BY Morris Rabkin
ATTORNEY

United States Patent Office 2,838,305

Patented June 10, 1958

2,838,305

MAGNETIC RECORDING AND REPRODUCING APPARATUS

John J. Hoehn, Merchantville, and Fielding B. Hills, Atco, N. J., assignors to Radio Corporation of America, a corporation of Delaware Original application July 1, 1954, Serial No. 440,758. Divided and this application October 31, 1955, Serial No. 543,994

6 Claims. (Cl. 271—2.3)

The subject matter of this invention is a division of the subject matter of our copending application Serial No. 440,758, filed July 1, 1954, entitled "Magnetic Recording and Reproducing Apparatus."

This invention relates to magnetic recording and reproducing apparatus which is commonly referred to as magnetic recording apparatus, and more particularly to a type of magnetic recording apparatus which is popularly used, by way of example, in the home.

It is an object of the present invention to provide an improved mechanism for handling magnetic record members in the form of a reelable tape.

It is another object of the present invention to provide an improved multiple speed drive means for a mechanism of the type hereinbefore set forth.

In accomplishing these and other objects, there has been provided in accordance with the present invention an improved drive system for magnetic recording apparatus which includes a capstan flywheel which is to be driven and a stepped driving member on a driving shaft. Two idlers are provided for coupling one or the other of the steps on the driving member in driving relation with the periphery of the flywheel. Means are also provided to effect selective engagement of the two idlers.

An understanding of the present invention may be had from the following detailed description when read in connection with the accompanying drawings in which.

Figure 1:
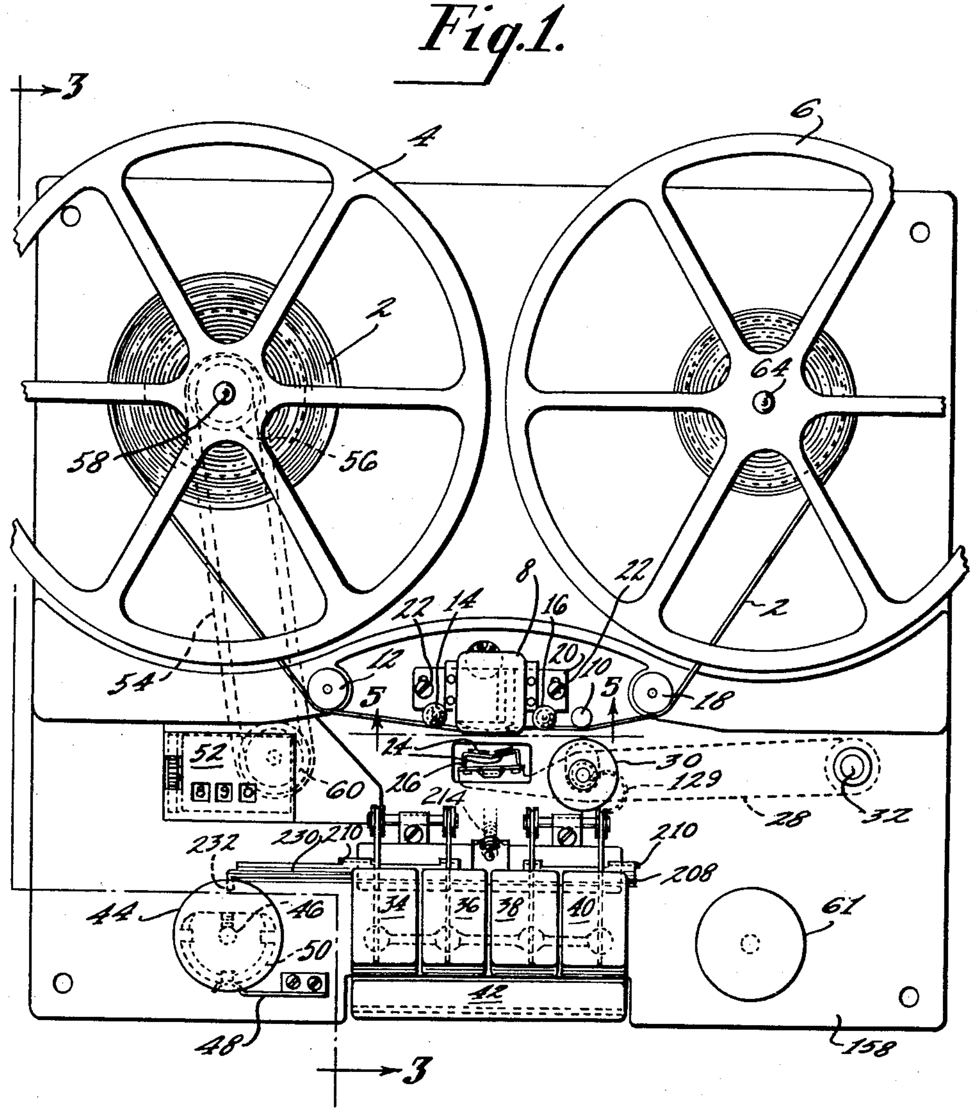
Fig. 1 is a plan view of apparatus constructed in accordance with the present invention with certain cover members removed to show the details of the structure.

Referring now to the drawings in more detail, there is shown in Fig. 1 a tape recording apparatus in which a tape record member 2 is fed from a supply reel 4 to a take-up reel 6. In its transit from one of these reels to the other, the tape is guided in a path past a magnetic record transducer 8 and a capstan 10. A plurality of guide members 12, 14, 16 and 18 assists in defining the tape path. The transducer unit 8 is mounted on a mounting plate 20. A pair of screws 22 is provided whereby the mounting plate 20 may be readily adjustable, as will be more fully described hereinafter. Positioned adjacent the transducer unit 8, but slightly spaced therefrom, is a pressure pad arrangement 24. The pressure pads 24 are mounted on a carrier member 26 which is in turn mounted on an arm 28. Also mounted on the arm 28 is a resilient pressure roller 30. The resilience may be supplied by a rubber, or the like, tire surrounding the hub of the roller. The arm 28 is mounted for a slight amount of pivotal movement about a remote pivot axis or member 32. Movement of the arm 28 from the position shown in Fig. 1 to the opposite extreme position of its limited movement causes the pressure pads 24 to engage the transducer unit 8 in such a manner as to cause an intimate contact between the record member and the transducer 8 when such a record member is positioned between the pressure pads 24 and the transducer 8. Coincident with the movement of the pressure pads 24 towards the transducer 8, the pressure roller 30 similarly presses the tape record member 2 into intimate driving relation with the capstan 10.

The operation of the mechanical features of this apparatus is controlled by a plurality of push-button type control members. A first control member 34 is coupled to the apparatus to condition the machine for playback operation. The second control member 36 is coupled to condition the apparatus for fast rewind operation. The third control member 38 is coupled to condition the machine for fast forward operation, and the fourth control member 40 is coupled to condition the machine for recording operation. A fifth control member 42 extending as a bar across the ends of the first four control members is a stop lever. The manner of operation and the interconnection of these control members will be more fully set forth hereinafter. Initiation of operation of the apparatus as well as speed selection, to be more fully described hereinafter, is accomplished through the rotation of a control knob 44 operatively associated with a shaft 46. A detent spring 48 is associated with the control knob shaft 46, through cooperation with a detent plate 50, to index the position of the control knob 44 in any of three desired positions.

Figure 2:
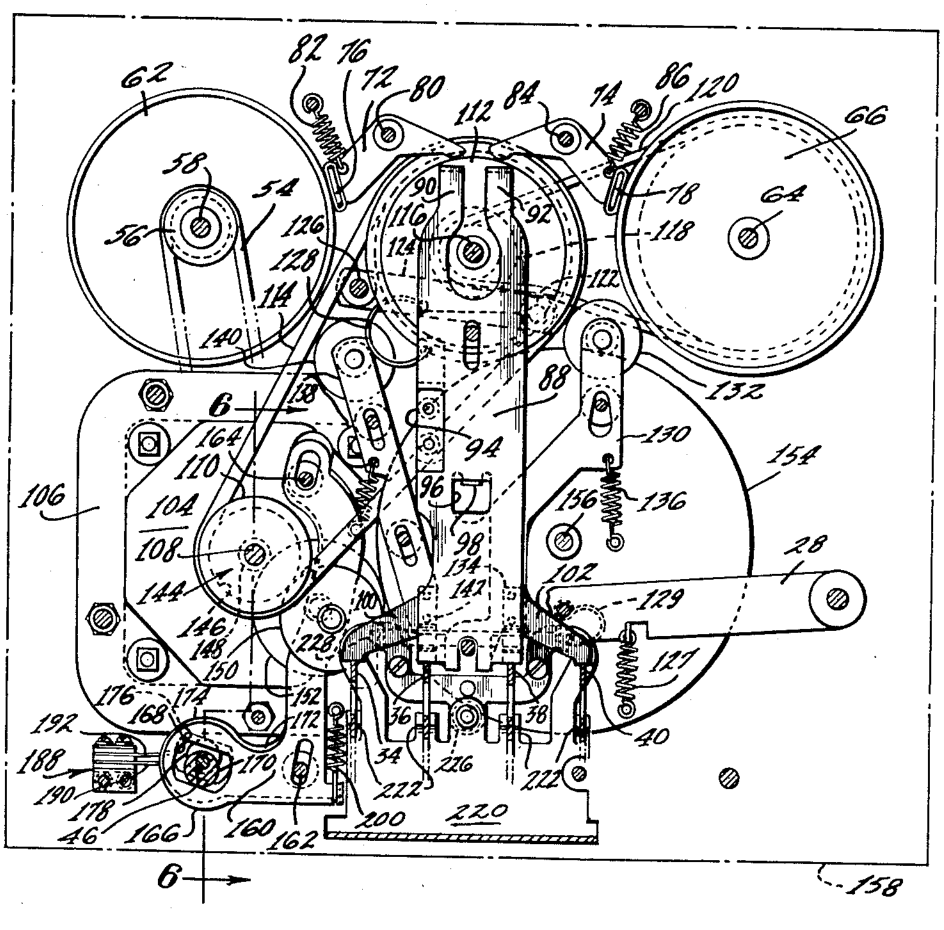
Fig. 2 is a plan view similar to that of Fig. 1 but with the upper deck removed to show details of apparatus therebelow.

As a convenience to the operator of the mechine in order to assist him in playing or recording on predetermined and selected portions of a tape record 2, there is provided a counter mechanism 52 which is operatively coupled to the supply reel 4 through an endless belt 54. The endless belt 54 couples a driving pulley 56 on the shaft 58 associated with the supply reel 4 to a driven pulley 60 on the counter mechanism 52. Such an interconnection may be used effectively to count the revolutions of the supply reel 4, and thereby identify selected portions of a tape record. There is also shown, schematically, a knob 61 for controlling the operation of an associated amplifier (not shown). A supply reel 4 illustrated in Fig. 1 is mounted on a spindle or shaft 58. The shaft 58 is iillustrated in Fig. 2 as being driven by a wheel 62. Similarly, the take-up reel 6 is mounted on a shaft or spindle 64. In Fig. 2, this shaft is illustrated as being driven by a wheel 66 which is comparable to the wheel 62 driving the first mentioned shaft 58. Positioned adjacent the periphery of these wheels is a pair of brake members 72 and 74. The first brake member 72 is associated with the wheel 62 driving the supply reel shaft 58. The other brake member 74 is associated with the wheel 66 driving the take-up reel shaft 64. The brake members themselves are in the form of bell cranks. Each member has an upturned end portion 76 and 78, respectively, which engages the periphery of the associated wheel. The wheel engaging portions of the brakes may be encased in a rubber sleeve-like portion to enhance the frictional engagement between the brakes and the periphery of the wheels.

The brake member 72 is pivoted about a brake pivot axis 80 and is biased into an engagement with the periphery of the wheel 62 by a spring 82. It will be noted that if the wheel 62 tends to turn in a counterclockwise direction, the frictional engagement between the periphery of the wheel and the brake member will tend to cause the brake member to be more firmly applied. The braking force thus applied is regenerative. If, on the other hand, the wheel turns in a clockwise direction, the frictional engagement between the brake and the periphery of the wheel tends to lessen the applied braking force. This braking force is degenerative. The brake member 74 is pivoted about a brake pivot axis 84 and is biased into engagement with the periphery of the wheel 66 by a spring 86. In a manner somewhat analogous to that just described as the brake member 72, the braking force applied to the wheel 66 by the brake member 74 is degenerative for counterclockwise rotation of the wheel and regenerative for clockwise rotation of the wheel 66.

The two brakes may be disengaged from the surface of the two wheels by operation of any of the first four push-button control members 34, 36, 38, 40. The ends of the brake members remote from the wheel engaging portion are positioned to be engaged by a brake operating slide plate 88. The slide plate 88 is an elongated generally rectangular member. The end of the slide plate 88 which engages the brake members is bifurcated to provide legs 90 and 92. A second sliding plate 94 underlies the brake operating slide 88 and, in certain conditions, cooperates with the brake operating slide. The brake operating slide plate 88 has a window or opening 96 located approximately centrally thereof. The second sliding plate 94 is provided with an upturned lip 98 which extends into the window or opening 96 in a position to engage the rearmost edge thereof.

The forward end of the brake operating slide plate 88 is positioned to be engaged directly by the operating portion of either the second or third push-button control members 36 and 38 respectively. When either of these two control members is pushed, the brake operating slide is engaged, sliding it toward the rear and causing the disengagement of the two brake members from the peripheries of the two wheels 62 and 66. The release of these push-buttons allows the slide to return to its forward position and permits the brakes to be reapplied. The second sliding plate 94 has an arm 100 that extends laterally to a position to be engaged through the operation of the first push-button control member 34. A second arm 102 extends laterally in the opposite direction to a position whereby to be engaged by the operating of the fourth push-button control member 40. Depression of either of these two control members 34 or 40 causes the second sliding plate 94 to be moved toward the rear of the apparatus. When the plate 94 moves, the lip 98 extending therefrom engages the edge of the window 96 in the brake operating slide 88. With such an engagement, the brake operating slide 88 is carried along with the second plate in its rearward movement whereupon the brakes are again released whenever either of the two control members 34 or 40 are depressed. In this manner, it may be seen that the brakes 72 and 74 are released from their engagement with the wheels 62 and 66 respectively whenever any of the four push-button control members 34, 36, 38 and 40 are depressed.

In order to apply rotational power to the various elements of the apparatus, there is provided a motor 104. The motor 104 is mounted on a mounting plate 106. The motor shaft 108 carries a pulley 110. The pulley 110 is coupled to an idler pulley 112 by an endless belt 114. The idler pulley 112 is mounted on a shaft 116 and carries, for simultaneous rotation therewith, a smaller pulley 118. The smaller pulley 118 is coupled by a loose fitting endless belt 120 to the wheel 66 which is mounted on the take-up reel spindle or shaft 64. The belt 120 is sufficiently loose that substantially no appreciable torque is transmitted to the wheel 66 by rotation of the idler pulley 112. However, a jockey roller 122 is mounted on an arm 124 which is pivoted about a stud 126. The arm 124 is coupled through a resilient coupling such as a relatively stiff C-spring 128 to the second sliding plate 94. It will be remembered that the sliding plate 94 is moved to the rear whenever the first push-button control member 34 or the fourth member 40 is depressed. The movement, under the influence of either the push-button control members 34 or 40, of the sliding plate 94 to the rear causes compression of the C-spring 128. This, in turn, applies a force on the arm 124 causing the jockey roller 122 to tighten the belt 120. With the belt 120 thus tightened, rotation of the idler pulley 112, and hence of the smaller pulley 118, will cause a corresponding rotation of the wheel 66 and of take-up reel 6 whenever such reel is mounted on the spindle or shaft 64. However, since the coupling is accomplished by means of the resilient C-spring 128, the driving force is not positive. That is, slippage may be accommodated as between the wheel 66 and the pulley 118.

The arm 28 which carries the pressure pads 24 and the pressure roller 30 is also coupled to the plate 94 through a relatively stiff C-spring 129. Thus, whenever the plate 94 is moved to the rear as aforesaid, the arm 28 is moved about its pivot 32 against the pressure of a bias spring 127 to bring the pressure pads 24 and the pressure roller 30 into operation. The actual velocity of the tape will be determined by the rotational velocity of the capstan 10 against which the tape 2 is held by the pressure roller 30. The take-up reel 6 is overdriven by the belt 120. That is, the belt 120 tends to drive the reel 6 faster than is necessary to take up the tape payed-out by the capstan 10. However, since the belt coupling to the wheel 66 is relatively loose, slippage may be accommodated. This allows the reel to apply enough tension in the tape between the reel and the capstan to keep the tape taut, but allows the capstan to regulate the velocity of the tape.

A sliding arm 130 carries a resilient idler roller 132. The idler roller 132 is positioned adjacent the periphery of the wheel 66 and the idler pulley 112. The forward end of the sliding arm is coupled through a relatively stiff U-spring 134 (see Figs. 3 and 4) to the third control member 38. Thus, whenever the third control member 38 is depressed, the sliding arm 30 is moved to the rear against the bias of biasing spring 136 to move the resilient idler roller 132 into simultaneous engagement with the periphery of the pulley 112 and the wheel 66. Release of the control member 38, of course, permits the idler roller to be withdrawn from physical contact with the pulley 112 and the wheel 66 by operation of the biasing spring 136. It may now be seen that two coupling means have been provided for imparting a driving force to the wheel 66, one through the belt 120 and the other through the roller 132. The first of these means provides for a relatively slow rotation of the wheel 66 while the coupling through the use of the idler roller 132 provides a high speed rotation of the wheel 66. The low speed drive is utilized whenever a tape record is being transduced while the high speed drive is used to rapidly advance the record member 2 to a selected portion of the record.

A second sliding arm 138 carries an idler roller 140 on one end thereof. The forward end of the sliding arm 138 is coupled through a relatively stiff U-spring 142 to the second push-button control member 36. The idler roller 140 is positioned when advanced under the influence of the second control member 36, overcoming the effect of a biasing spring 143, to press the endless belt 114 against the periphery of the wheel 62. This, of course, drives the wheel 62 at the linear velocity of the belt. Such rotation is desirable to effect high speed rewinding of a tape record member 2 back on to the supply reel 4.

The motor 104 has on its shaft 108 in addition to the pulley 110 a stepped driving puck 144. One step 146 of this puck 144 is substantially twice the size of the second step 148. Positioned for selective engagement with these two steps is a pair of idler rollers 150 and 152. One of these idler rollers 150 is adapted to effect a driving connection between the larger step 146 of the puck 144 and a flywheel 154. The flywheel 154 is mounted on a shaft 156 which extends through a suitable bearing (not illustrated) through the upper deck or main mounting panel 158 and has the capstan 10 mounted directly thereon. The second idler roller 152 is adapted to effect engagement between the smaller step 148 and the periphery of the flywheel 154. The first idler roller is mounted on a slide plate 160. The slide plate 160 is slidingly mounted on a pair of studs 162 and 164 respectively. An extension 166 of the slide plate 160 defines a cam follower surface 168.

As previously mentioned, the shaft 46 of the control knob 44 extends through the mounting panel 158 and carries a cam member 170. Rotation of the shaft 46 causes the cam member 170 to engage the cam follower surface 168 moving the slide plate 160 towards the rear of the apparatus. This carries the idler roller 150 into an engagement between the step 146 on the puck 144 and the periphery of the flywheel 154, thereby causing rotation of the flywheel at a speed which is determined by the relative diameters of the flywheel and the larger step 146. Similarly, the second idler roller 152 is mounted on a slide plate 172. This slide plate is also slightly carried by the studs 162 and 164. This slide plate 172 also has an extension 174 which defines a cam follower 176. A second cam member 178 is mounted on the shaft 46 and is similar in configuration to that of the cam member 170 but is positioned 180° out of phase with the first cam member 170. Movement of this slide plate 172 under the influence of the cam member 178 causes the idler roller 152 to become engaged between the flywheel 154 and the smaller step 148 on the puck 144. It will be noted that in one extreme position of rotation of the shaft 146, the flywheel is driven by engagement of one of the idler rollers with one step upon the driving puck while the other idler roller is disengaged. However, upon rotation of the shaft 46 through 180° to the opposite limit of rotation, the capstan flywheel is driven by engagement of the other idler roller with the other step of the driving puck 144, the first mentioned idler being disengaged. However, a 90° rotation of the shaft 46 from either of its extreme positions results in a withdrawal of both idler pulleys from engagement from either the puck or the capstan flywheel.

Figure 6:
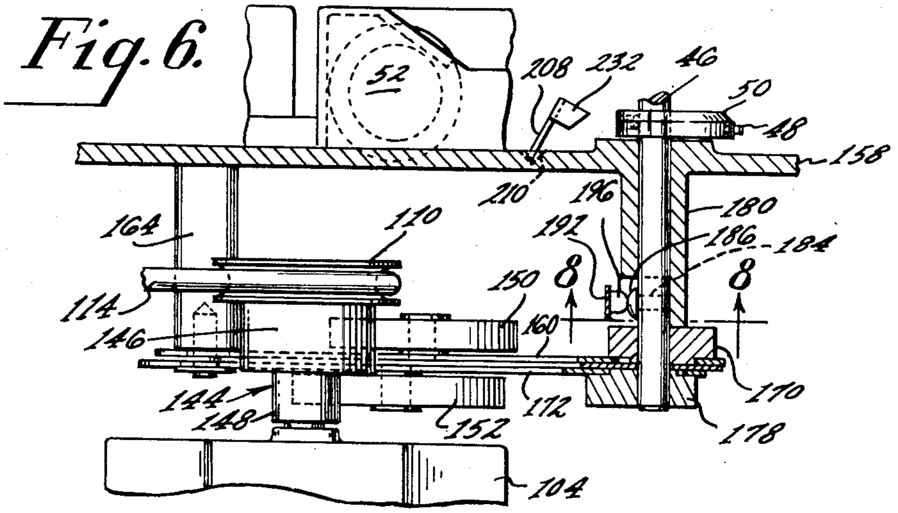
Fig. 6 is an enlarged view partly in cross section taken along the line 6—6 of Fig. 2 and viewed in the direction of the arrows.
Figure 8:
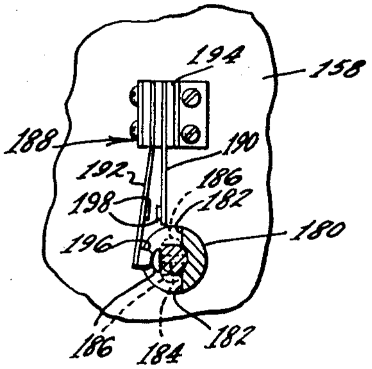
Fig. 8 is a view partly in cross section taken along the line 8—8 of Fig. 6 and viewed in the direction of the arrows.

As may be seen more clearly in Figs. 6 and 8, the shaft 46 extends through a sleeve bearing 180 which is either fixed to the main mounting panel 158 or may be moulded integrally therewith. A portion of the lower end of the sleeve bearing is cut away to define a pair of stop shoulders 182. A pin 184 having an enlarged head 186 extends through the shaft 46 with the enlarged head 186 protruding beyond the peripheral surface of the shaft 46. As the shaft 46 is rotated to either of its extreme positions, the enlarged head 186 engages the shoulder 182 as shown dotted in Fig. 8. A main power switch 188 is provided to permit power to be supplied to operate the apparatus or to interrupt such operation. The switch 188 comprises a simple spring contact switch having a short contact leg 190 and a longer movable leg 192 mounted in the usual insulated mounting base 194. The longer leg 192 has an insulated cam following portion 196 which when the shaft 46 is in either of its extreme position, rides on the periphery of the shaft allowing the contact points 198 to close, permitting electrical energy to be supplied to the apparatus. When, however, the shaft 46 is in the position of 90° rotation from either of the extreme positions, the insulated cam following portion 196 is engaged by the enlarged head 186 of the pin 184 forcing the longer leg 192 to move away from the shorter leg 190 and opening the contact points 198.

Figure 7:
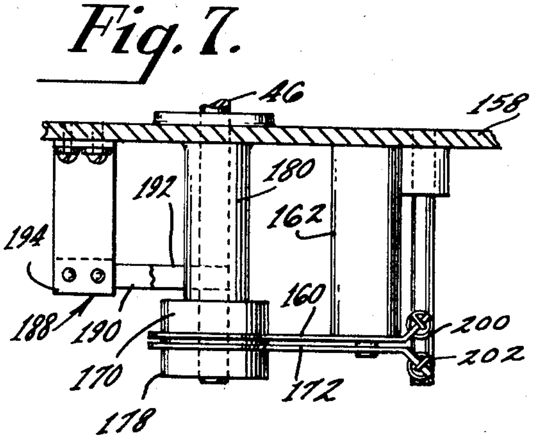
Fig. 7 is a fragmentary end view partly in cross section of the structure shown in Fig. 6.

Thus, by operation of the one shaft 46 the power may be applied to drive the apparatus at either of two selected speeds, depending upon which idler roller engages the flywheel, the speed selected is effected and, upon interrupting the power, the mechanical coupling between the motor and the flywheel is disengaged. This latter feature assures that no prolonged pressure will be applied to small areas of any of the rollers in the driving train causing a permanent set to be imparted to the resilient surfaces thereof when the machine is turned off. Such a permanent set would constitute a distortion in the smooth periphery of one or more of the rollers, which distortion would be reflected in the operation of the capstan and produce an audible distortion in the recording or reproducing of a record driven by the capstan. Biasing springs 200 and 202 are provided for normally urging the slide plates 160 and 172, respectively, toward the engaged positions. As may be more clearly seen in Figs. 2 and 7, the cam members 170 and 178 comprise a pair of eccentrically mounted discs. Each of the discs has an enlarged flange which overlies the openings in the sliding plates which constitute the cam follower surfaces 168 and 176. In this manner, the cam members, in addition to providing the driving means for sliding members, also help provide means for retaining the plates in parallel relationship.

Figures 3, 4, 5:
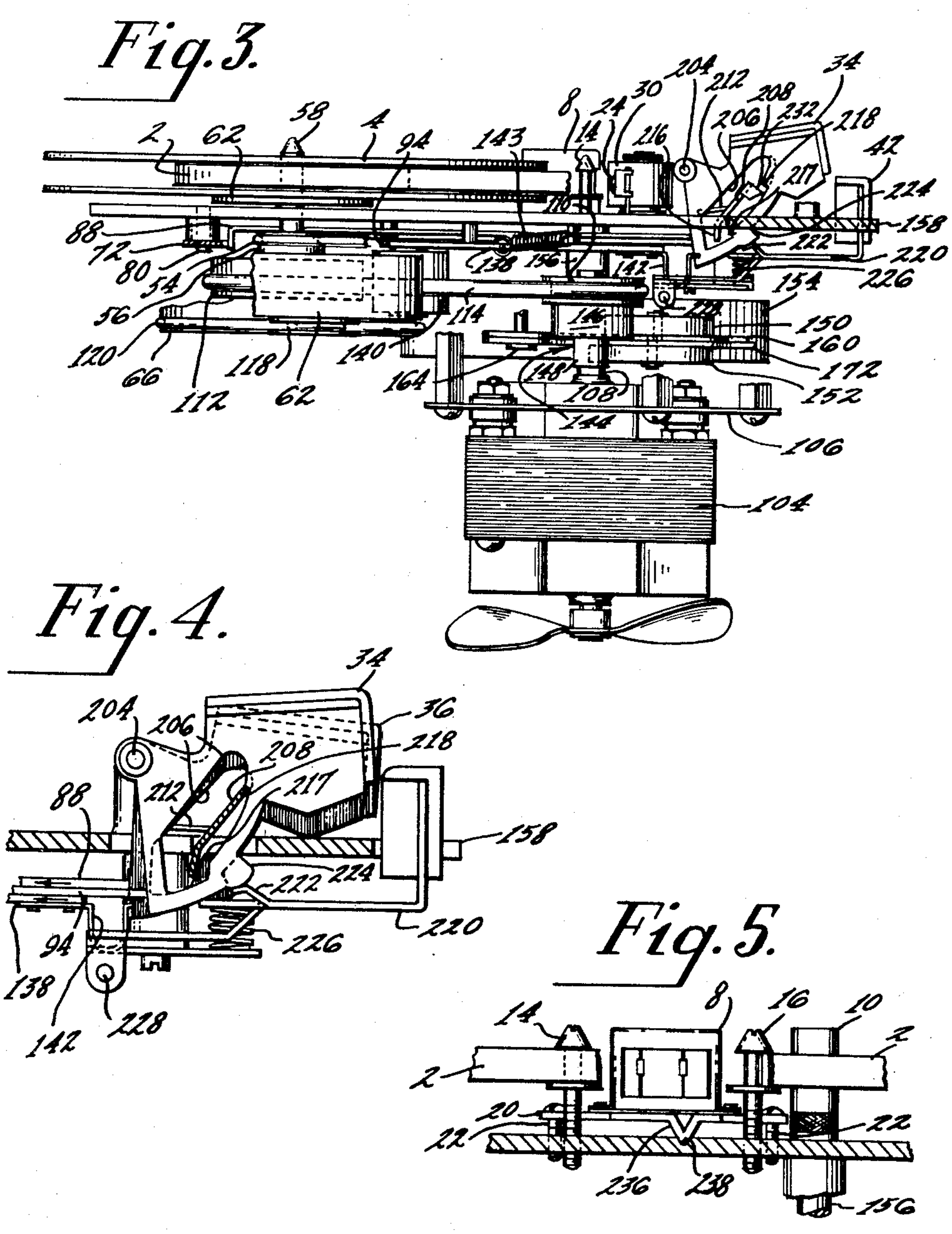
Fig. 3 is a cross sectional view taken along the line 3—3 of Fig. 1 and viewed in the direction of the arrows.
Fig. 4 is an enlarged view illustrating the operation of push-button control members.
Fig. 5 is a view partly broken away, partly in cross section taken along the line 5—5 of Fig. 1 and viewed in the direction of the arrows.

The push-button control members have been briefly set forth hereinbefore. They will now be described in detail with particular reference to Figs. 2, 3 and 4. Each of the first four push-button control members 34, 36, 38 and 40 comprises a substantially sector S-shaped member pivoted about a pivot axis 204. Each of the control member sectors has a central opening 206 through which an interlock bar 208 passes. The interlock bar 208 comprises a flat strip which rests in recesses 210 in the main mounting panel 158. The interlock bar 208 is provided with an arm 212 which extends at an angle to the main body thereof and which is engaged by a retaining spring 214. The spring serves to retain the interlock bar 208 in the recesses 210 and tends to bias the bar out of locking engagement with the push-buttons. The interlock bar 208 is also provided with a pair of depending fingers 216 which are located within the opening 206 provided in each of the two centermost push-button control members 36 and 38. Each of these two push-button control members 36 and 38 is provided with a protuberance 217 which extends into the opening 206 and when either of these two push-buttons is depressed engages the depending finger 216 of the interlock bar 208. Such engagement between the protuberance 217 and the finger 216 causes the interlock bar 208 to be rotated about its edge which rests in the recess, bringing the upper edge of the bar 208 into blocking position. Each of the two extreme push-button control members 34 and 40 has an interlock stop shoulder 218 extending into the opening 206 in such a position that when the interlock bar 208 is moved to its blocking position as illustrated in Fig. 4, the upper edge of the interlock bar 208 substantially engages the blocking shoulder 218 preventing a depression of either of the two extreme push-button control members 34 and 40.

The fifth push-button control member or stop lever 42 comprises a plate 220 which substantially underlies the first four push-button control members 34, 36, 38 and 40 and is provided with four latch fingers 222. Each of the first four push-button control members 34, 36, 38 and 40 is provided with a latch finger engaging catch 224. Whenever any one of the push-buttons is depressed, the latch finger engaging catch 224 rides past the latch finger 222 of the stop lever 42 until the latch finger engaging catch 224 is engaged by the latch finger 222, holding the selected push-button in its depressed position. Since each of the first four push-button control members 34, 36, 38 and 40 is biased to its upward position by the biasing springs heretofore described and the stop lever 42 is biased to its upward position by a biasing spring 226, the engagement of the latch finger engaging catch 224 and the latch finger 222 will hold the selected control member depressed until such time as the stop lever 42 is depressed. Pressing downward on the stop lever 42 causes the plate 220 to be moved about its pivot axis 228 moving the latch fingers 222 downward so as to disengage any one of them from the catch on the selected push-button.

As has heretofore been indicated, the two centermost push-buttons control the rapid winding of a tape in a forward or reverse direction, depending upon which of the two push-buttons is selected, while the two outermost push-buttons are used to establish a reproducing or record condition in the apparatus, hence, a relatively low speed tape reeling condition. It is further noted that the reel brakes 72 and 74 are disengaged whenever any one of the first four push-buttons are depressed. Thus, if one of the two centermost push-buttons is depressed, the tape is reeled at high speed. It is then, sometimes, desired to go immediately into slow speed action. If either of the outermost keys is depressed, the inertia of the take-up reel would be overcome by the clamping of the tape between the pressure roller 30 and the capstan 10. However, the inertia of the supply reel would not be overcome. In such a case, it would be almost inevitable that considerable tape would be spilled over the machine. However, in the apparatus just described, it is impossible to depress either of the extreme push-buttons to establish low speed operation while one of the two high speed push-buttons remains depressed since the interlock bar 208 prevents the depression of the two extreme push-buttons when either of the two center push-buttons is in a depressed condition. The stop bar must first be depressed, releasing the high-speed push-buttons and, simultaneously therewith, applying the brakes 72 and 74 to the two wheels 62, 66 thereby overcoming the inertia of the high speed operation and the tendency toward spilling of the tape.

The interlock bar 208 has a lateral extension 230 and has a terminating end portion 232 bent substantially at right angles to the main plane of the interlock bar 208. This terminating end portion 232 cooperates with two of the recesses 234 in the detent plate 50 associated with the control knob 44 and its shaft 46. Whenever the machine is turned on, one of the recesses 234 in the detent plate 50 is aligned with the end portion 232 of the interlock bar 208. Such arrangement permits either of the two high speed push-buttons to be depressed without interference. However, so long as the high speed push-button is depressed, the machine cannot be turned off by rotation of the knob 44. The stop lever 42 must first be depressed releasing the interlock bar. This arrangement eliminates the possibility of inadvertently leaving the machine in condition for high speed operation while the power is off. If, under such conditions, a fresh reel of tape were placed on the appropriate spindle and the power turned on, considerable tape would be spilled before the operation could be stopped.

As previously mentioned, the transducer unit is mounted on a mounting plate 20. This mounting plate 20 is generally flat in configuration but has a depending V-shaped fulcrum 236 which rests in a depression or recess 238 in the main mounting panel 158. The transducer illustrated, for example, in Fig. 5 is of the type in which a recording head and an erasing head are formed into a single compact unit. In this instance, the recording head is positioned with respect to the fulcrum so as to be positioned in a line substantially perpendicular to the plate in passing through the pivot axis of the fulcrum. The two screws 22 located on opposite sides of the fulcrum provide means whereby the plate 20 may be tilted on its axis with respect to the main mounting panel 158. Such tilting causes a similar motion of the transducer and hence provides for a means of adjusting the signal translating gap of the head in azimuth with respect to the path of movement of the record tape 2. As may be seen in Fig. 1, screws 22 pass through elongated slots in the plate 20. This provides for displacement of the transducer unit toward or away from the tape path to provide a measure of adjustment in that direction. The height of the tape with respect to the transducer may be adjusted by the two adjustable guide members 14 and 16.

Thus, there has been provided an improved tape recording apparatus which features improved tape handling means and includes improved interlock means for coordinating the operation of the control members.

What is claimed is:

1. In a magnetic recording and reproducing apparatus, a capstan for driving a record receiving member, driving means for driving said capstan at either of two selected speeds comprising a motor having a shaft, a stepped puck on said shaft, a flywheel directly coupled to said capstan, a first idler roller, a second idler roller, a first and a second slide plate for individually supporting each of said rollers axially displaced from each other to dispose each of said rollers in cooperative relationship with a different one of said steps, said first roller being rotatably mounted on said first slide plate, said second roller being rotatably mounted on said second slide plate, and means for sliding said plates with respect to each other for selectively providing for frictional engagement between a different one of said rollers and said puck and said flywheel.

2. In a magnetic recording and reproducing apparatus, a capstan for driving a record receiving member, driving means for driving said capstan at either of two selected speeds, and means for effecting selection as between said two speeds, said driving means comprising a motor having a shaft, a stepped puck on said shaft, a flywheel directly coupled to said capstan, a first idler roller operable to effect frictional engagement with said flywheel and with one step on said stepped puck, a second idler roller operable to effect frictional driving engagement with said flywheel and a second step on said stepped puck, a first and a second slide plate, said first roller being rotatably mounted on said first slide plate, said second roller being mounted on said second slide plate, a control shaft, a first cam member on said control shaft cooperatively associated with said first slide plate and a second cam member on said shaft cooperatively associated with said second slide plate, said first and second cam members being positioned with respect to each other on said control shaft selectively to effect alternative engagement of one or the other of said rollers with said flywheel and said stepped puck.

3. In equipment for use with movable records, record speed change mechanism cooperating with a rotary record driving member and a drive motor shaft comprising a stepped driving puck on said motor shaft, a pair of axially displaced friction idler rollers each being adapted to cooperate with a different one of the steps on said puck, a slide plate having one of said rollers rotatably mounted thereon, another slide plate having the other of said rollers rotatably mounted thereon, a control shaft for effecting said speed change, means for supporting each of said slide plates for cooperation with different, axially displaced portions of said control shaft, a pair of similar cams, said cams being disposed at said portions on said control shaft, one of said cams being disposed 180 degrees out of phase with respect to the other of said cams, and means for biasing said slide plates into engagement with said cams whereby said slide plates are relatively movable with respect to each other upon rotation of said control shaft to effect alternative engagement of one or the other of said rollers with said puck and said driving members.

4. The invention set forth in claim 3 wherein said engagement is effected at positions of said control shaft angularly displaced 180 degrees apart, and each of said cams having the surface thereof shaped to permit disengagement of both of said rollers from said puck and said driving member at a position of said shaft intermediate said displaced positions.

5. The invention as set forth in claim 4 characterized by the addition of a power switch associated with said control shaft, an operating member for said switch, a member mounted on said shaft and rotatable therewith cooperating with said switch operating member to provide for said switch being in closed condition when said shaft is in either of its displaced positions and in open condition at said intermediate position.

6. In record utilizing apparatus, mechanism for driving a record member at a selected one of a plurality of record driving speeds comprising a record driving shaft, a wheel on said shaft for driving said shaft, a drive motor having a shaft, means supporting said shafts with the axes thereof generally paralleling each other, a driving member on said motor shaft having axially displaced portions of different diameters, idler rollers having frictional driving surfaces arranged between said shafts, means for supporting each of said rollers with the axis thereof generally paralleling said shaft axis and axially displaced from each other to individually cooperate with a different one of said portions of said driving member, and means cooperating with said supporting means for said rollers for displacing a selected one of said rollers along a plane perpendicular to said shaft axes to frictionally engage said wheel and said cooperating portion of said driving member.

References Cited in the file of this patent

UNITED STATES PATENTS

| | | |
|---|---|---|
| 2,260,319 | Hoehn | Oct. 28, 1941 |
| 2,658,398 | Masterson | Nov. 10, 1953 |
| 2,680,613 | Williams | June 8, 1954 |
| 2,681,224 | Bessire | June 15, 1954 |
| 2,705,639 | Lekas | Apr. 5, 1955 |